United States Patent
Binder et al.

(10) Patent No.: US 11,502,584 B2
(45) Date of Patent: Nov. 15, 2022

(54) ROTOR FOR A ROTATING ELECTRIC MACHINE

(71) Applicant: Flender GmbH, Bocholt (DE)

(72) Inventors: Herbert Binder, Neuburg (DE); Helmut Ecker, Pfarrkirchen (DE); Robert Gruber, Ruhstorf (DE); Oliver Memminger, Neuburg a. Inn (DE); Klaus Schifferer, Neuhaus am Inn (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 17/613,375

(22) PCT Filed: Apr. 3, 2020

(86) PCT No.: PCT/EP2020/059529
§ 371 (c)(1),
(2) Date: Nov. 22, 2021

(87) PCT Pub. No.: WO2020/239299
PCT Pub. Date: Dec. 3, 2020

(65) Prior Publication Data
US 2022/0255408 A1 Aug. 11, 2022

(30) Foreign Application Priority Data

May 24, 2019 (EP) .................................... 19176480

(51) Int. Cl.
*H02K 13/02* (2006.01)
*H02K 11/21* (2016.01)
(Continued)

(52) U.S. Cl.
CPC ............. *H02K 13/02* (2013.01); *H02K 11/21* (2016.01); *H02K 13/003* (2013.01); *H02K 13/04* (2013.01); *H02K 13/08* (2013.01)

(58) Field of Classification Search
CPC ...... H02K 11/21; H02K 13/003; H02K 13/02; H02K 13/04; H02K 13/08
(Continued)

(56) References Cited

U.S. PATENT DOCUMENTS 5,822,652 A * 10/1998 Elhatem ............. G03G 15/0818
310/233
8,531,064 B2 * 9/2013 Robertson ...... A61B 17/320783
310/68 B
(Continued)

FOREIGN PATENT DOCUMENTS

CN 201726261 1/2011
CN 102969856 3/2013
(Continued)

OTHER PUBLICATIONS

He et al., English Machine Translation of CN 104158351 (Year: 2014).*

(Continued)

*Primary Examiner* — Rashad H Johnson
(74) *Attorney, Agent, or Firm* — Henry M. Feiereisen LLC (57) ABSTRACT

A rotor for a rotating electric machine includes a rotor winding arranged for conjoint rotation on a rotor shaft, and a slip ring body arranged on an axial end of the rotor shaft and having an end face on an axial end of the slip ring body opposite to the rotor winding. The slip ring body includes connection adapters which project axially beyond the end face of the slip ring body for connection of line ends of the rotor winding. A driver unit for a rotary encoder is fastened to the end face of the slip ring body and/or to the axial end of the rotor shaft and electrically insulated from the connection adapters. A centrifugal force support ring is arranged on the end face of the slip ring body such that the connection (Continued)

adapters and the driver unit are arranged in a through-opening of the centrifugal force support ring.

16 Claims, 8 Drawing Sheets

(51) Int. Cl.
    *H02K 13/00*     (2006.01)
    *H02K 13/08*     (2006.01)
    *H02K 13/04*     (2006.01)
(58) Field of Classification Search
    USPC .......................... 310/231, 232, 233, 234, 237
    See application file for complete search history.

(56) References Cited

U.S. PATENT DOCUMENTS

| | | | |
|---|---|---|---|
| 11,387,713 B2* | 7/2022 | Binder | H02K 13/003 |
| 2016/0256153 A1* | 9/2016 | Shelton, IV | H02K 11/21 |
| 2018/0152081 A1* | 5/2018 | Sakai | H02K 11/40 |
| 2019/0326800 A1* | 10/2019 | Pyeon | H02K 29/08 |
| 2019/0363608 A1* | 11/2019 | Haun | F16D 1/06 |
| 2019/0386539 A1* | 12/2019 | Mukai | H02K 7/04 |
| 2021/0126515 A1* | 4/2021 | Yang | F16C 19/06 |
| 2022/0112758 A1* | 4/2022 | Krivoy | E05F 15/63 |
| 2022/0166288 A1* | 5/2022 | Nose | H02K 5/1732 |

FOREIGN PATENT DOCUMENTS

| | | |
|---|---|---|
| CN | 104158351 | 11/2014 |
| DE | 102013217306 | 3/2015 |
| WO | WO 2010/048956 | 5/2010 |
| WO | WO 2016/165939 | 10/2016 |

OTHER PUBLICATIONS

International Search Report issued by the European Patent Office in International Application PCT/EP2020/059529 dated Jun. 29, 2020.

* cited by examiner

ROTOR FOR A ROTATING ELECTRIC MACHINE

CROSS-REFERENCES TO RELATED APPLICATIONS

This application is the U.S. National Stage of International Application No. PCT/EP2020/059529, filed Apr. 3, 2020, which designated the United States and has been published as International Publication No. WO 2020/239299 A1 and which claims the priority of European Patent Application, Serial No. 19176480.2, filed May 24, 2019, pursuant to 35 U.S.C. 119(a)-(d).

BACKGROUND OF THE INVENTION

The invention relates to a rotor for a rotating electric machine comprising a rotor shaft, a rotor winding arranged on the rotor shaft for conjoint rotation, a slip ring body arranged on an axial end of the rotor shaft, wherein an end face of the slip ring body is formed on an axial end of the slip ring body opposite the rotor winding, and a driver unit for a rotary encoder arranged non-rotatably with respect to the rotor, which driver unit is fastened to the end face of the slip ring body and/or to the axial end of the rotor shaft. In addition, the invention relates to a rotating electric machine comprising a stator and a rotor rotatably mounted in an opening of the stator.

Electric machines of this type as well as rotors for this purpose are extensively known in the prior art, and there is no need to provide separate proof of this in printed form. In a rotating electric machine, a stator is usually provided, which in the case of a rotating electric machine designed as an Internal rotor usually provides a substantially circular opening for receiving a rotor. The rotor is rotatably mounted in the opening, wherein an air gap is formed between the rotor and the stator. In the case of a rotating electric machine designed as an external rotor, this can be provided in a dual manner in reverse.

The rotating electric machine is a device that converts electric energy into mechanical energy, especially kinetic energy in a motor mode, and/or mechanical energy into an electric energy in a generator mode. The movement is usually a rotational movement performed by the rotor in relation to the stator. In contrast to the rotor, the stator is arranged non-rotatably, i.e., the rotary motion is a rotary motion of the rotor in relation to the stator.

The stator and the rotor are linked by means of a magnetic flux during normal operation of the rotating electric machine, whereby in motor mode the force effect, namely the torque, is provided, which drives the rotor in rotation in relation to the stator. In generator mode, by contrast, mechanical energy supplied to the rotor, in the form of rotation under the action of a torque, is converted into an electric energy. For this purpose, the stator and the rotor each have a winding through which an electric current flows. In the stator or the rotor, the winding can also be supplemented by a permanent magnet.

Rotating electric machines of the type described are, for example, rotating field machines which are connected to a preferably multi-phase, in particular three-phase electrical power supply network, for example asynchronous machines, in particular doubly fed asynchronous machines, synchronous machines, synchronous machines with damper cage, or the like.

In order to be able to make electrical contact with the rotor winding during normal operation, i.e., in particular when the rotor is rotating in relation to the stator, a slip ring body, which is coupled to the rotor shaft for conjoint rotation is generally arranged in the region of an axial end of the rotor shaft. The slip ring body generally has at least two electrically conductive surfaces or slip ring surfaces—also known as slip rings—arranged adjacently to one another and electrically insulated from one another, which can be contacted by corresponding contact elements during normal operation or in the normal configuration of the rotating electric machine, so that an electrical connection to the rotor winding can be achieved via the slip ring body. For this purpose, the rotor winding is connected to the slip ring body, in particular to its slip ring surfaces.

In many applications of electric machines, it is necessary or useful to have available information about the current speed of the rotor. For this purpose, a rotary encoder is usually provided, which is preferably arranged in the region of the axial end of the rotor shaft. The rotary encoder is in turn arranged non-rotatably in relation to the rotor, for which purpose the encoder is usually fixedly connected to a housing of the rotating electric machine.

In the region of the axial end of the rotor shaft or in the region of an end face of the slip ring body, which is formed opposite an end face of the slip ring body facing the rotor winding, a driver unit is generally arranged, which is coupled to the rotor shaft or the end face of the slip ring body with respect to the rotation during normal operation of the rotating electric machine. In the assembled state of the rotating electric machine, i.e., when the rotor is arranged rotatably mounted in relation to the stator, the driver unit couples the rotary encoder, and therefore the rotary encoder can directly detect the current rotational speed of the rotor, for example. The rotary encoder then supplies a corresponding rotational speed signal. This can be made available to a higher-level controller, which is used to control the rotating electric machine. In addition to the rotational speed, a rotational position and/or the like can of course also be detected by means of the rotary encoder and a corresponding signal can be output.

The driver unit thus has the function of transmitting the rotation and/or rotational position of the rotor shaft to the rotary encoder or coupling the latter rotationally. Such a structure is known, for example, from WO 2010/048956 A1.

Although the teaching of WO 2010/048956 A1 has proven itself in principle, it has been found to be disadvantageous insofar as a reduction of the dimensions in the axial direction of the rotor shaft is not possible with this teaching. Furthermore, it is not apparent from WO 2010/048956 A1 how the slip ring body can be connected to the rotor winding. In particular, however, because creepage distances and air gaps must be observed for reasons of electrical safety, no reduction of the dimensions in the direction of the axial extension of the rotor shaft can be achieved with the teaching of WO 2010/048956 A1. The values to be observed for electrical safety with regard to creepage distances and air gaps are subject to standardization, for example EN 60079-7 or similar.

The object of the invention is to improve the integration of the driver unit at the axial end of the rotor shaft so that a reduction in dimensions can be achieved, in particular with regard to the longitudinal extension of the rotor shaft.

SUMMARY OF THE INVENTION

As a solution, the invention proposes a rotor and a rotating electric machine according to the independent claims.

Advantageous refinements result from the features of the dependent claims.

With regard to a rotor of the type described, the invention particularly proposes that the slip ring body has connection adapters which project axially beyond the end face of the slip ring body and to which conductor ends of the rotor winding are connection, and wherein the driver unit is electrically insulated from the connection adapters at least in a partial region which is arranged at the same level as the connection adapters in the direction of an axis of rotation of the rotor shaft.

With regard to a rotating electric machine of the type described, it is proposed in particular that the rotor is designed in accordance with the invention.

The invention is based, among other things, on the idea that the integration of the driver unit on the rotor can be improved if the connection adapters project axially beyond the end face of the slip ring body and, at the same time, the driver unit is arranged in the partial region so that, with respect to the axial height, improved utilization can be achieved, which can be used to reduce the overall axial extension of the rotor. In order for this integration to be achieved, the invention provides for the connection adapters to be electrically insulated from the driver unit. Specifically, this allows the actual creepage distances and air gaps to be reduced so that the electrical safety requirements can be achieved. This takes into account that during the intended operation of the rotating electric machine, the rotor winding can be subjected to partly large electrical voltages, in particular also with respect to a reference potential of the electric machine, for example a ground potential, an earth potential or the like.

At the same time, the invention allows the rotor to be manufactured in a simple and cost-effective manner, because specifically the connection region for the rotor winding formed on the end face by the connection adapters can remain accessible even after the rotor or the rotating electric machine has been assembled, whereby in particular maintenance work, for example on the slip ring body or its slip ring surfaces or the like, can continue to be carried out in a simple manner. At the same time, the driver unit can be arranged, in particular fastened, in the partial region, so that the driver unit and the connection adapters share the partial region at least in part. Overall, an improved design with reduced dimensions and improved maintenance options can be achieved in this way.

The slip ring body is a component which serves to provide an electrical connection between the rotor, in particular the rotor winding, and an energy source or energy sink external to the rotor during normal operation of the rotating electric machine. For this purpose, the slip ring body provides at least two slip ring surfaces arranged electrically insulated from one another and running in the circumferential direction, which can be electrically contacted by corresponding contact elements of the electric machine, for example brushes or the like, which are preferably arranged non-rotatably in relation to the stator, in order to be able to make the electrical connection in this way. The slip ring body generally comprises an electrically insulating body element on which the slip ring elements are arranged or formed. The slip ring body can have an opening, in particular a through-opening, which allows the rotor shaft to be guided through the slip ring body. Preferably, a connection for conjoint rotation between the rotor shaft and the slip ring body can hereby be achieved at the same time. The slip ring body is preferably arranged or fastened at the axial end of the rotor shaft. However, it may also be provided that the slip ring body itself is fastened at the axial end of the rotor shaft. Of course, it can also be provided for the slip ring body to have a blind bore which serves to receive the axial end of the rotor shaft.

The slip ring body generally has two opposite end faces in the axial direction relative to an axis of rotation of the rotor, one of which end faces is opposite the rotor winding and the other end face faces away from the rotor winding. The connection adapters project axially beyond the end face formed at the axial end of the slip ring body opposite the end face facing the rotor winding, so that the electrical connection of the line ends of the rotor winding to the connection adapters can be implemented in a simple manner. For this purpose, it can be provided that the line ends are led through an axial opening of the rotor shaft and/or the slip ring body. It has proven to be particularly advantageous if the rotor shaft is designed as a hollow shaft and the line ends are guided through the hollow shaft to its axial end, preferably to the connection adapters. In this way, not only can a simple assembly and a simple design be achieved, but the line ends can also be arranged in a protected manner during normal operation of the rotating electric machine. In particular, they can be supported by the rotor shaft with respect to centrifugal forces.

The driver unit is attached to the end face of the slip ring body and/or to the axial end of the rotor shaft. As a result, the driver unit rotates in the same way as the rotor shaft or the slip ring body or the rotor. The fastening can be achieved by fastening the driver unit by means of fastening elements to the end face of the slip ring body and/or to the axial end of the rotor shaft. The connection can be made with a screw connection, a rivet connection, an adhesive connection and/or the like.

The driver unit is usually made of a metal so that it can withstand well the high temperature stresses that occur during normal operation. In principle, however, it can also be made of a plastic, a ceramic material, a composite material and/or the like.

In order to make it possible for the driver unit to be arranged at least in the partial region which is level with the connection adapters in the direction of the axis of rotation of the rotor winding, it is provided that the driver unit is electrically insulated from the connection adapters. This makes it possible for the partial region to be used by both the driver unit and the connection adapters at the same time. The electrical insulation can be provided by an electrically insulating material of a suitable type, for example by arranging an electrically insulating material between the connection adapters and the driver unit or the like. The electrically insulating material can be a plastic, in particular a fiber-reinforced plastic, a ceramic material, in particular a sintered ceramic material, combinations thereof and/or the like. However, the electrically insulating material can also be provided at least in part by the connection adapters and/or the driver unit. Combinations thereof can also be provided.

The partial region thus provides an overlap region in the axial direction of the axis of rotation of the rotor shaft, in which overlap region both the driver unit at least in part and the connection adapters at least in part are arranged. The partial region thus refers in particular to a region, extending in the axial direction of the rotor shaft, of the joint arrangement of the driver unit or at least parts thereof on the one hand and the connection adapters or at least parts thereof on the other. The term height therefore refers to the axial direction of the axis of rotation of the rotor shaft.

For the purpose of good current conduction, the connection adapters as well as the electrical lines have good electrical conductivity and can, for example, be made of a material, in particular a metal, which provides high electrical conductivity, for example, copper, aluminum, silver, alloys thereof and/or the like. At least the line ends also preferably have suitable electrical insulation, which on the one hand permits electrical insulation from other parts during normal operation and on the other hand can at the same time be designed at the end in such a way that good electrically conductive contacting of the line ends with the connection adapters can be achieved in the connected state. The connection between the connection adapter and the line ends can, for example, be a clamp connection, a screw connection, but also a soldered connection, a welded connection and/or the like. Preferably, the connection is designed to be detachable in order to facilitate maintenance of the rotor.

The Invention makes it possible to arrange the driver unit and the connection adapters as well as the line ends in a common region, specifically the partial region, and at the same time to comply with the requirements regarding creepage distances and air gaps. This arrangement makes it possible to reduce the axial extension of the rotor, thus reducing the overall size of the electric machine.

It is further proposed that the rotor has a centrifugal force support ring with a through-opening, which is arranged on the end face of the slip ring body in such a way that the connection adapters and the driver unit are arranged at least in part in the through-opening of the centrifugal force support ring. Particularly advantageously, the centrifugal force support ring can thus be used to support the connection adapters with respect to centrifugal forces during a rotary movement of the rotor. The centrifugal force support ring thus makes it possible to reduce the stress due to centrifugal forces in a connection region provided by the connection adapters, which can improve the reliability and durability of the rotor. At the same time, the centrifugal force support ring can provide a protective function that is able to protect the elements arranged in its through-opening from mechanical stresses acting from outside, for example dust and/or the like. The basic function and a possible structure for a centrifugal force support ring is disclosed, for example, in WO 2016/165939 A1.

The centrifugal force support ring is preferably made of a suitable material, for example a ceramic material or also a plastic or also a composite material, combinations thereof or the like. Overall, a further improvement in the invention can be achieved by the centrifugal force support ring. An axial extension of the centrifugal force support ring is preferably selected in such a way that the connection of the line ends to the connection adapters is possible, wherein, however, the connection adapters are reliably supported. The centrifugal force support ring can be connected to the end face of the slip ring body by means of a mechanical and/or integrally bonded connection. The connection can, for example, be realized mechanically by means of screws, rivets or the like. An integrally bonded connection can be realized, for example, by means of adhesive bonding, welding or other connection methods. Of course, combinations of these can also be provided.

It is also proposed that the driver unit has at least in part an electrically insulating material. This means that the driver unit itself can provide at least part of the electrical insulation. Particularly advantageously, the driver unit provides the electrically insulating material at least in the partial region. For this purpose, the driver unit can be formed at least in part from the electrically insulating material. The electrically insulating material can here be a plastic, a suitable ceramic material, but also a composite material and/or the like. Preferably, the electrically insulating material is selected in accordance with the thermal requirements during normal operation of the electric machine.

In addition, it is proposed that the driver unit has a retaining plate with a driver pin for connection to the rotary encoder and at least one fastening bolt for fastening to the end face of the slip ring body and/or to the axial end of the rotor shaft, wherein the retaining plate and the at least one fastening bolt are designed to be electrically insulated. This refinement takes into account that in particular the retaining plate and/or the fastening bolt can be arranged in the partial region, and therefore these parts can preferably be used to provide the required electrical insulation. For this purpose, a coating of the electrically insulating material can be arranged, in particular formed, on the retaining plate and/or the at least one fastening bolt.

Of course, the driver unit does not have to have only one fastening bolt. Two, three or even more fastening bolts can also be provided, which may preferably be of substantially identical design. This can further improve the overall stability of the driver unit. The driver unit can be fastened by means of the fastening bolts, for example by means of a screw fastening, an adhesive fastening, a welded fastening and/or the like. The fastening bolts can be detachably connected to the retaining plate, for example by means of a screw fastening or the like. In addition, the fastening bolts can of course also be non-detachably connected to the retaining plate, for example by means of an adhesive connection, a welded connection and/or the like.

Preferably, the electrically insulating material at least in part forms a coating of the driver unit. The coating is particularly advantageously formed in a region of the driver unit which, in the assembled state, is arranged in the partial region, so that the electrical insulation can be produced or at least supported. This allows the driver unit to be made suitable for use of the invention in a simple manner. Thus, a new driver unit does not necessarily have to be constructed for the invention. The coating may be formed by a resin, a varnish, combinations thereof and/or the like, which preferably sufficiently withstand the temperature stress in the intended operation of the rotating electric machine. Such a coating may, for example, be formed of a Teflon or the like. In addition, the coating can of course also be formed by applying an insulating material, for example by printing, spraying, foiling or the like. The electrically insulating material can thus also be formed by a foil, which is capable of forming a coating of the driver unit.

Preferably, the retaining plate and/or the at least one fastening bolt are made of an electrically insulating material. Thus, the electrical insulation can be realized in a simple way by the driver unit. Preferably, it can be provided that the retaining plate and/or the fastening bolt are provided with a corresponding electrically insulating coating. The electrical coating can be designed in such a way that the creepage distances and air gaps that must be maintained for normal operation are realized. Preferably, the coating has a corresponding, suitable withstand voltage, wherein in particular a layer thickness of the coating can be selected accordingly depending on material properties.

According to a further refinement, it is proposed that the retaining plate and/or the at least one fastening bolt are formed from an electrically insulating material. The fastening bolt or, if applicable, also the retaining plate can thus already be electrically insulating due to the material used. In such a case, of course, there is no need for separate electrical insulation. In particular, no additional coating is required to realize the electrical insulation in the specified manner. This can save effort. In addition, this design is also particularly suitable if coatings can be damaged during normal operation, for example during maintenance work or the like, for example when the driver unit is mounted on the slip ring body and/or on the axial end of the rotor shaft, the line ends are mounted on the connection adapters or are also dismantled or the like. If the retaining plate or also the at least one fastening bolt is made of an electrically insulating material, any damage that may occur during such work need not result in damage to the electrical insulation. This can reduce reliability not only during normal operation but also, in particular, during maintenance or the like.

An advantageous refinement provides that the retaining plate and/or the at least one fastening bolt are coated with an electrically insulating material. This refinement proves to be particularly advantageous if, for design reasons, the retaining plate and/or the at least one fastening bolt is to be formed from an electrically conductive material, for example a metal or the like. The coating can then at least in part realize the electrical insulation.

According to a refinement, it is proposed that the connection adapters have electrical insulation. In this way, the required electrical insulation can also be realized at least in part by the connection adapters or their electrical insulation. The electrical insulation can, for example, be formed by a coating that is applied to the connection adapter after connection and is also applied to the line end connected to the connection adapter. For example, the coating may be formed by a varnish, a resin, an oxide layer, and/or the like. Preferably, the electrical insulation of the connection adapters is such that it is sufficient in itself to provide the electrical insulation that is required.

It has proven to be particularly advantageous if the electrical insulation is formed at least in part by a sleeve made of an electrically insulating material. The sleeve can be plugged onto the connection adapter to which the particular line end is connected, after the particular line end has been connected. Preferably, the sleeve can be closed at the end and provides a blind opening so that the sleeve can be plugged onto the connection adapter in a simple manner. Preferably, connecting means are provided which allow the sleeve to be securely connected to the connection adapter, for example by a snap-in connection, a locking connection and/or the like, so that the sleeve is fixed to the connection adapter for normal operation of the rotating electric machine.

The sleeve can, for example, be formed from a suitable plastic, from a suitable ceramic material, from a suitable composite material and/or the like. Particularly advantageously, the sleeve can of course also be formed by a suitable heat-shrinkable tube which, after being fitted onto the connection adapter, can be shrunk onto the connection adapter and the line end connected to it by means of a suitable, in particular thermal, treatment. In this way, a particularly simple and reliable connection of the sleeve to the connection adapter can be achieved.

The insulation need not be provided by the driver unit or the connection adapters alone, and instead a combination thereof can also be provided. In this way, redundancy can also be achieved with regard to the electrical insulation, so that a particularly high level of reliability can be achieved during normal operation and also during maintenance of the rotating electric machine, in particular the rotor.

The advantages and effects specified for the rotor according to the invention naturally also apply equally for the rotating electric machine equipped with the rotor according to the invention. Even if in the present case the rotating electric machine is a rotating electric machine designed as an Internal rotor, the corresponding advantages and effects naturally apply equally for a rotating electric machine designed as an external rotor. The corresponding adaptations with regard to the stator and the rotor of the rotating electric machine are easy for the skilled person to see, so that he can realize the idea of the invention in a simple way also with a rotating electric machine designed as an external rotor.

BRIEF DESCRIPTION OF THE DRAWING

Further advantages and features will emerge from the following description of embodiment examples based on the figures. In the figures, like reference signs denote like features and functions.

The figures show.

DETAILED DESCRIPTION OF PREFERRED EMBODIMENTS

Figure 1:
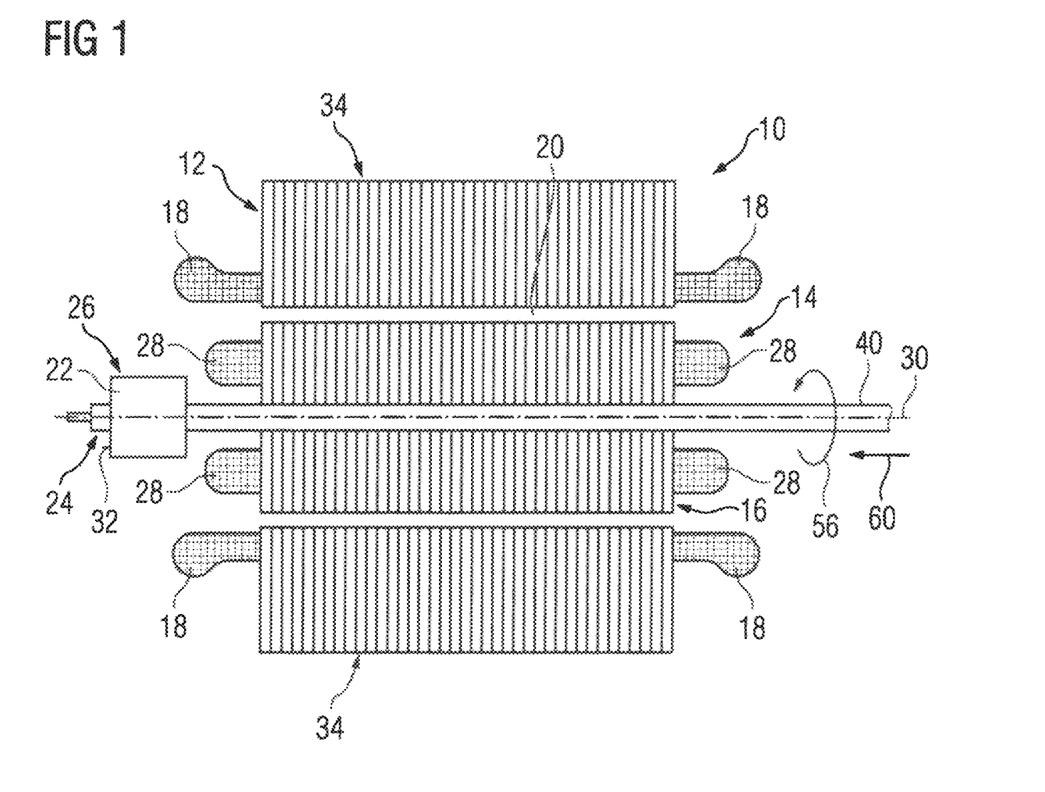
FIG. 1 a schematic sectional view of a doubly fed asynchronous machine.

FIG. 1 shows a schematic sectional view of a doubly fed asynchronous machine 10 as a rotating electric machine which is designed for connection to a three-phase alternating voltage network and which has a stator 12 which is arranged non-rotatably. The stator 12 has a central through-opening (not provided with a reference sign) in which a rotor 14 is arranged rotatably mounted about an axis of rotation 30.

The stator 12 further comprises a stator laminated core 34, in which grooves extending substantially parallel to the axis of rotation 30 are formed by teeth (not shown) of the stator laminated core 34 arranged in a circumferential direction 56. In alternative embodiments, the teeth may also be arranged in an inclined manner.

Electrical conductors (not shown) are arranged in the grooves. The electrical conductors form a stator winding. The stator winding is thus arranged in the stator laminated core 34. In FIG. 1, winding heads 18 projecting from the stator winding in the axial direction 60 beyond the stator laminated core 34 are visible. The section in FIG. 1 is a longitudinal section along the axis of rotation 30 of the rotor 14, which is designed as an externally fed rotor 14 and which is arranged in the through-opening (not provided with a reference sign) of the stator laminated core 34.

The rotor 14 is rotatably arranged in the asynchronous machine 10 and fixed in its axial position in relation to the stator 12 by means of a bearing arrangement (not shown further), which can be formed, for example, by end shields. In the assembled state, an air gap 20 is formed between the stator 12 and the rotor 14.

The rotor 14 can be rotated about the axis of rotation 30 when the asynchronous machine 10 is operating normally.

The rotor 14 has a rotor laminated core 16 which also comprises electrical conductors (not shown), which form a rotor winding. The electrical conductors are formed as rods, which form a winding head 28 at each end face of the rotor laminated core 16.

The rotor 14 further has a rotor shaft 40 for mechanical connection to a rotatable mechanical device. The rotatable mechanical device may have any function, for example a drive function for an industrial machine, an electrically drivable motor vehicle or the like. In addition, the mechanical device can of course also be a combustion engine, a wind turbine and/or the like.

Depending on the mode of operation, mechanical energy can be supplied to the rotor 14 in the form of rotary motion or torque, so that the asynchronous machine 10 can be operated in a generator mode to provide electrical energy. However, in a motor mode, it can also draw electrical energy via the electrical power supply network connected to it and can provide torque via the rotor 14 and the rotor shaft 40.

Figure 4:
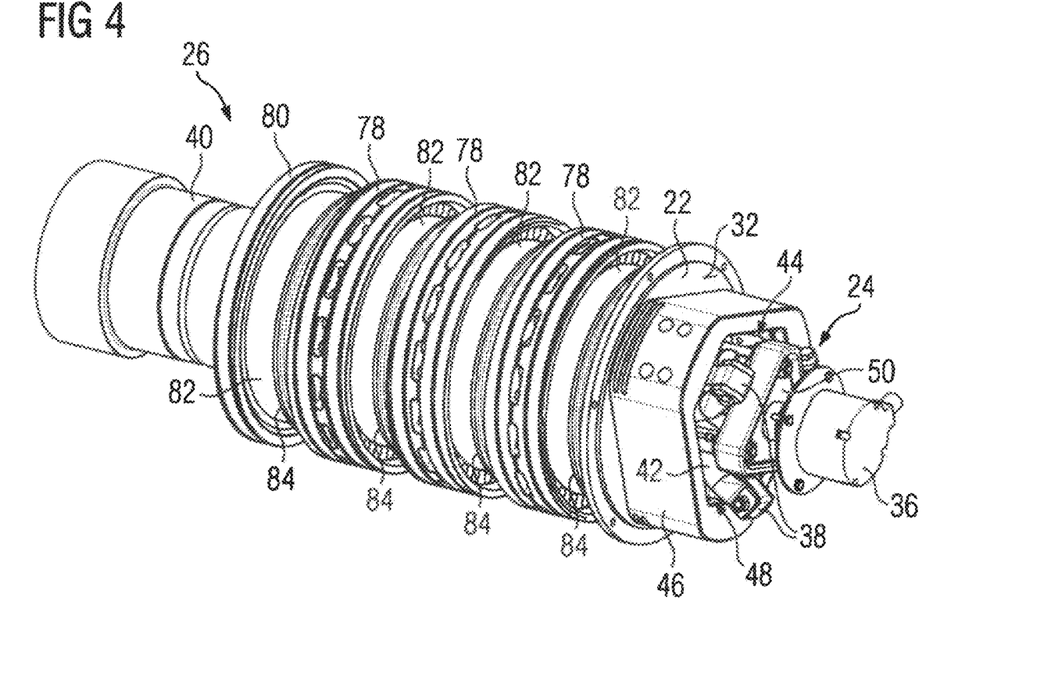

FIG. 1 further shows that the rotor winding is fastened to the rotor shaft 40 with the rotor laminated core 16. A slip ring body 22 is fastened to an axial end 26 of the rotor shaft 40, shown in the left region in FIG. 1. Adjacently in the axial direction 60 there is arranged a driver unit 24 for a rotary encoder 36 (FIG. 4). Both the slip ring body 22 and the driver unit 24 are coupled to the rotor shaft 40 for conjoint rotation.

In the present embodiment, the driver unit 24 is fastened to the axial end 26 of the rotor shaft 40. In alternative embodiments, however, it can also be fastened to an end face 32 of the slip ring body 22, which is formed at an axial end of the slip ring body 22 opposite the end facing the rotor winding. As will be described below, the rotor winding is connected to the slip ring body 22 so that, during normal operation of the asynchronous machine 10, the rotor winding can be supplied with electrical energy from an energy source external to the rotor in a predetermined manner. In the present case, an alternating rectifier is provided for this purpose. The driver unit 24 makes it possible to provide a sensor signal relating to the rotation of the rotor 14 in the state coupled to the rotary encoder 36.

Figure 2:
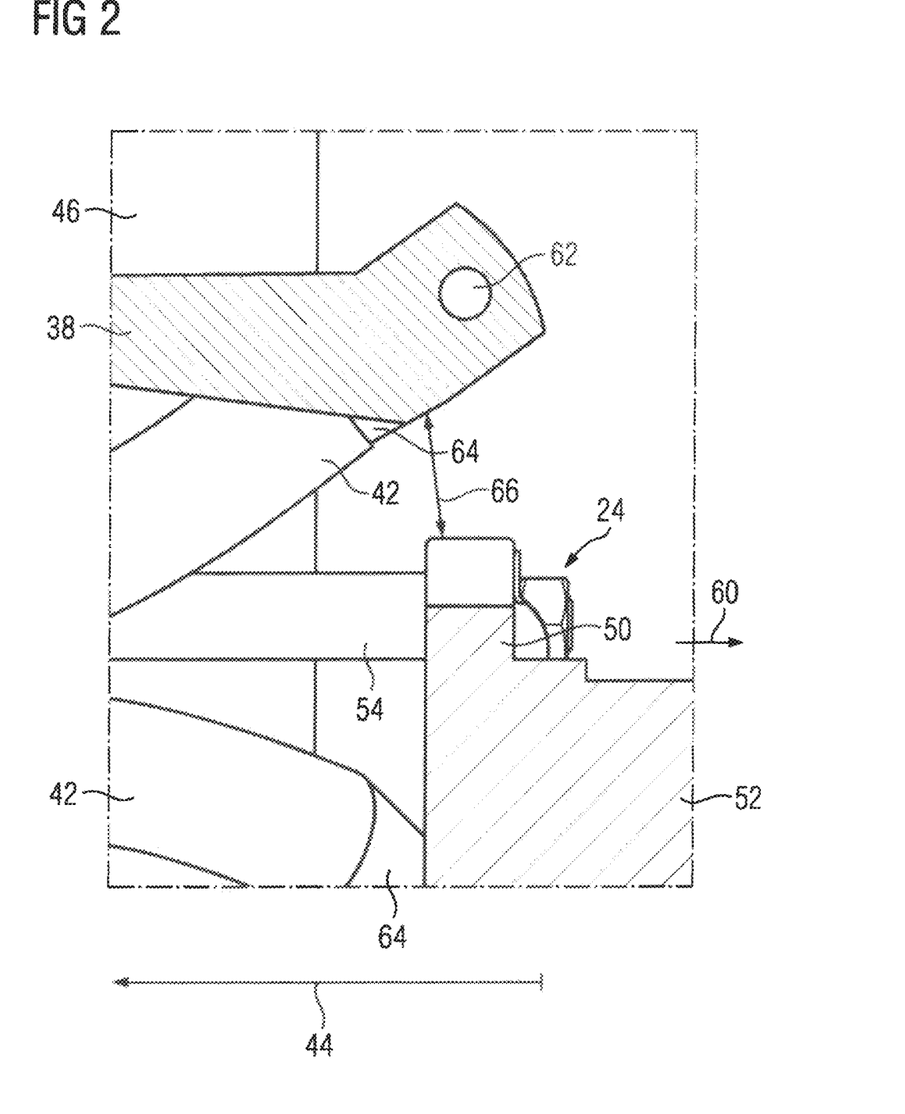
FIG. 2 a schematic sectional view of a driver unit arranged at a shaft end of a rotor of the asynchronous machine in accordance with FIG. 1, FIG. 3 a schematic sectional view of a further embodiment of a doubly fed asynchronous machine with a fan arranged at one shaft end of a rotor shaft, FIG. 4 a schematic perspective view of a slip ring body arranged at the axial end of the rotor shaft of the electric machine according to FIG. 1 with a driver unit arranged in the region of a connection of the rotor winding to the slip ring body, FIG. 5 a schematic perspective view similar to FIG. 4, in which line ends of the winding and the driver unit are not shown, FIG. 6 a schematic perspective view similar to FIG. 4 but without the slip ring body and the driver, FIG. 7 a schematic perspective view of the driver unit according to FIG. 4, FIG. 8 a schematic perspective view of a detail of the driver unit according to FIG. 7 in a plan view of a fastening region of the driver unit at the axial end of a rotor shaft according to FIG. 1, FIG. 9 in a schematic plan view, a detail of the axial shaft end of the arrangement according to FIG. 4, FIG. 10 a schematic sectional view similar to FIG. 2, but with a driver unit according to FIG. 7, FIG. 11 a schematic sectional view similar to FIG. 2, but in which connection adapters have an insulating sleeve as electrical insulation, and FIG. 12 a schematic perspective view of the end of the rotor shaft with the slip ring unit according to FIG. 11.

FIG. 2 shows a schematic sectional view of a connection area of the rotor winding to the slip ring body 22 and the driver unit 24. It can be seen that the connection area provides connection adapters 38 for line ends 42 of the rotor winding, which project in the direction 60 beyond the axial end 26 of the rotor shaft 40. In this case, the connection adapters 38 are components of the slip ring body 22, which is coupled to the rotor shaft 40 in a rotationally fixed manner at the end 26 of the rotor shaft 40.

Figure 6:
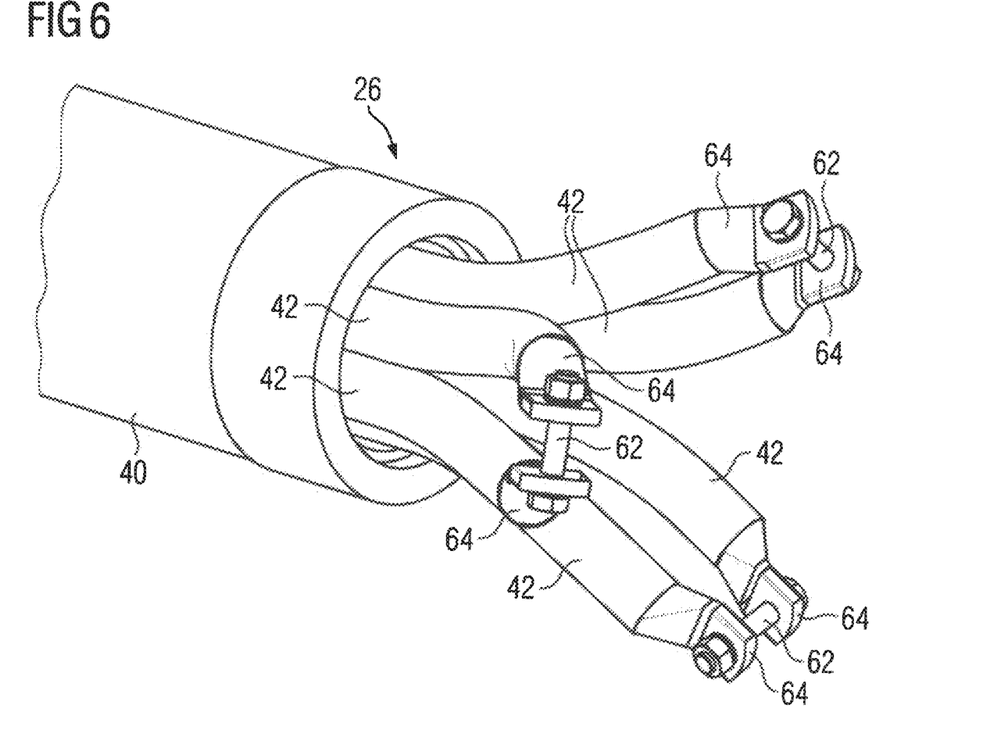
Figure 9:
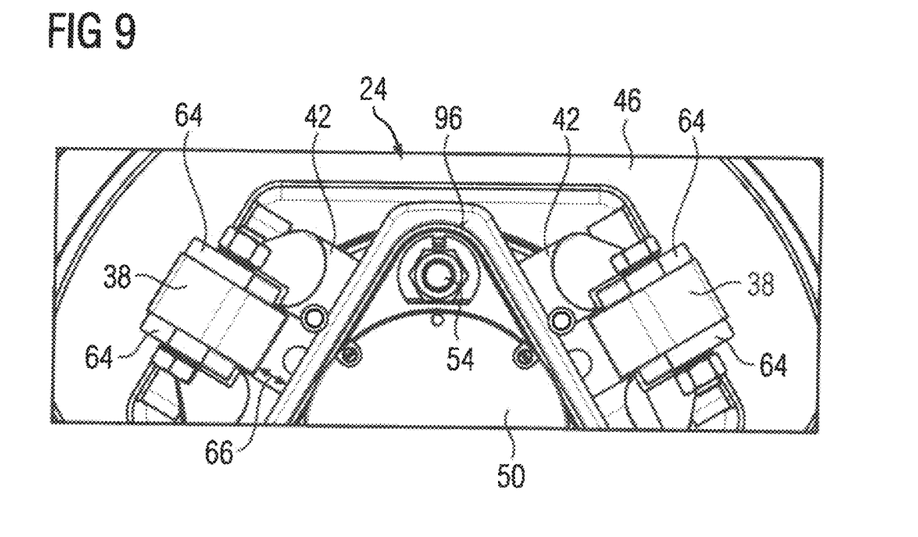

Conductor ends 42 of the rotor winding are fastened to the connection adapters 38 in each case by means of a fastening screw 62. For the purpose of fastening the line ends, these each have a lug 64 at the end, so that a reliable connection with good electrical conductivity can be achieved to the corresponding connection adapter 38 (FIGS. 6 and 9). Both the connection adapters 38 and the lugs 64 are made of a material with good electrical conductivity, in the present case a copper alloy. Depending on the design, however, another alloy may also be used here which provides a correspondingly good electrical conductivity.

FIG. 2 further shows that the driver unit 24 is arranged in the direction 60 of the axis of rotation 30 of the rotor shaft 40 at approximately the same height as the connection adapters 38 in a partial region 44. In the present case, the partial region 44 extends from the axial end 26 of the rotor shaft 40 to the extension of the connection adapters 38 in the direction 60. In alternative embodiments, however, the partial region 44 can extend from the end face 32 of the slip ring body 22 to the extension of the connection adapters 38 in the direction 60.

The reference sign 66 schematically represents an air gap which shows the smallest distance between the connection adapter 38 and the driver unit 24. Under the present actual design conditions, the air gap 66 is not sufficient during normal operation of the asynchronous machine 10 to be able to meet the requirements with regard to electrical safety. Since the driver unit 24 is made of steel in the present case, i.e., has good electrical conductivity, there is a risk that the rotary encoder 36 will be subjected to an inadmissibly high electrical voltage. In addition, of course, there may be the problem that the rotor shaft 40, which is also made of steel in the present case, may also be subjected to electrical voltage during normal operation of the asynchronous machine 10 because the air gap 66 is too small. The design according to FIG. 2 arises because the axial longitudinal extent of the rotor 14 is to be reduced to the greatest possible extent. It is therefore advantageous if the driver unit 24 projects into the connection region of the connection adapters 38 with the line ends 42. This could reduce the axial extension of the rotor 14.

Figure 3:
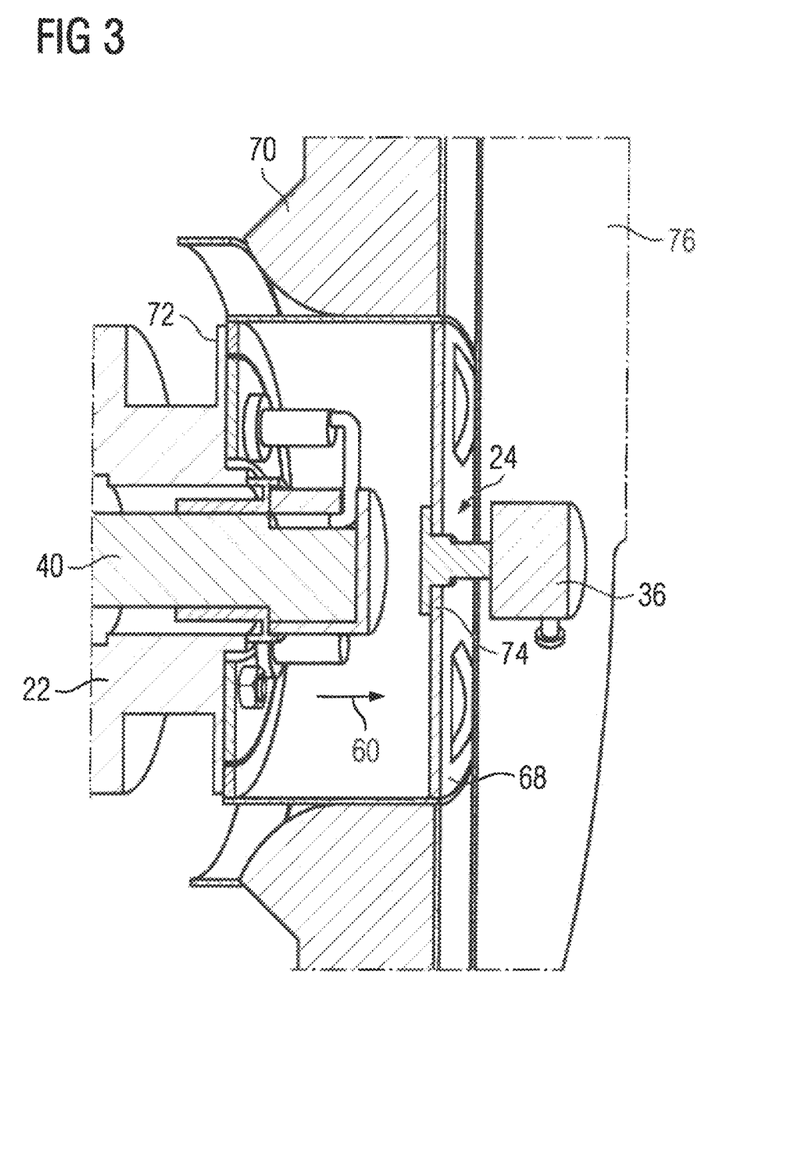

FIG. 3 shows a schematic sectional view of a further embodiment for an axial end of a rotor 14, which additionally has a fan 68 in the region of its axial end. In this embodiment, the fan 68 is fastened to a flange 72, which is fastened to the end face 32 of the slip ring body 22. The fan 68 has blades 70 by means of which an air flow can be achieved in a predetermined manner during normal operation of the asynchronous machine 10.

The driver unit 24 is connected to the fan 68 at another flange 74, which is opposite the flange 72 in the direction 60. FIG. 3 further shows that the driver unit 24 mechanically couples the rotary encoder 36. The rotary encoder 36 is non-rotatably fastened to a machine housing 76 of the asynchronous machine 10, which also comprises the stator 12.

In the design according to FIG. 3, the problem with regard to electrical insulation as explained with reference to FIG. 2 does not arise. However, this design proves to be disadvantageous with respect to the greater axial extension of the rotor 14. In addition, the problem may arise that the driver unit 24, during normal operation, carries out rotational vibrations which cannot be disregarded and which may lead to problems with the coupling of the rotary encoder 36. Such problems can be avoided with the design according to FIG. 2.

A design that refines the design shown in accordance with FIG. 2 and avoids the previously mentioned problems is shown with reference to FIG. 4 in a schematic perspective view. In FIG. 4, the axial end 26 of the rotor shaft 40 is shown enlarged. At the axial end 26 of the rotor shaft 40, there is arranged the slip ring body 22, which is coupled to the rotor shaft 40 for conjoint rotation and also in the axial direction.

As can be seen from FIG. 4, the slip ring body 22 has slip ring surfaces 80—also known as slip rings—which are arranged spaced apart from one another by means of insulation rings 82 and which, in the assembled state, are contacted by electrical contact brushes (not shown) arranged non-rotatably in order to be able to apply the electrical energy to the rotor 14 and in particular to its rotor winding during normal operation of the asynchronous machine 10.

On the rotor winding side, a slip ring 80 is further arranged on the slip ring body 22 and is also electrically insulated from the adjacent slip ring 78 by means of an insulation ring 82. The slip ring 80 is electrically connected to the rotor shaft 40. The slip ring 80 is used to connect the rotor shaft 40 to a reference potential, in this case an earth potential.

The slip rings 78, 80 are made of a material with good electrical conductivity, in this case a suitable stainless steel. The insulation rings 82 are made of an electrically insulating material, which in this case can be a plastic such as Bakelite or the like. The slip ring body 22 itself is made of a likewise electrically non-conductive material and is mechanically securely connected to the slip rings 78, 80 and the insulation rings 82. Depending on the embodiment, it can be provided that the slip ring body 22 can also be formed in one piece with the insulation rings 82. In order to increase creepage distances on the outer surface of the insulation rings 82, these have respective circumferential radially protruding projections 84. Additional contours can be provided, as required, to increase creepage distances.

A centrifugal force support ring 46 with a through-opening 48 is arranged on the end face 32 of the slip ring body 22 and is also formed from an electrically insulating material. The centrifugal force support ring 46 is formed in the present case from a suitable plastic which has a fiber reinforcement. By means of the centrifugal force support ring 46, connection adapters 38 of the slip ring body 22 are supported against acting centrifugal forces (FIG. 5), which are electrically coupled to the slip rings 78. This allows the slip rings 78 to be electrically connected to respective conductor ends 42 of the rotor winding.

The line ends 42 of the rotor winding are guided through the rotor shaft 40, specifically in an opening of the rotor shaft 40, to the axial end 26 of the rotor shaft 40. For this purpose, the rotor shaft 40 is formed at least in part as a hollow shaft (FIG. 6).

In the present case, the centrifugal force support ring 46 is fastened by means of a screw connection to the slip ring body 22 at the end face 32. For this purpose, the slip ring body 22 has a through-opening, through which it can also be fitted at the same time onto the axial end 26 of the rotor shaft 40. An internal thread is provided on the end face and is designed to receive an axially formed external thread of the centrifugal force support ring 46 in order to thereby establish a mechanical connection. Alternatively, the centrifugal force support ring 46 can also be connected to the slip ring body 22 by means of an integrally bonded connection, for example by means of an adhesive connection or the like.

In alternative embodiments, the centrifugal force support ring 46 may also be formed basically in one piece with the slip ring body 22.

Figure 5:
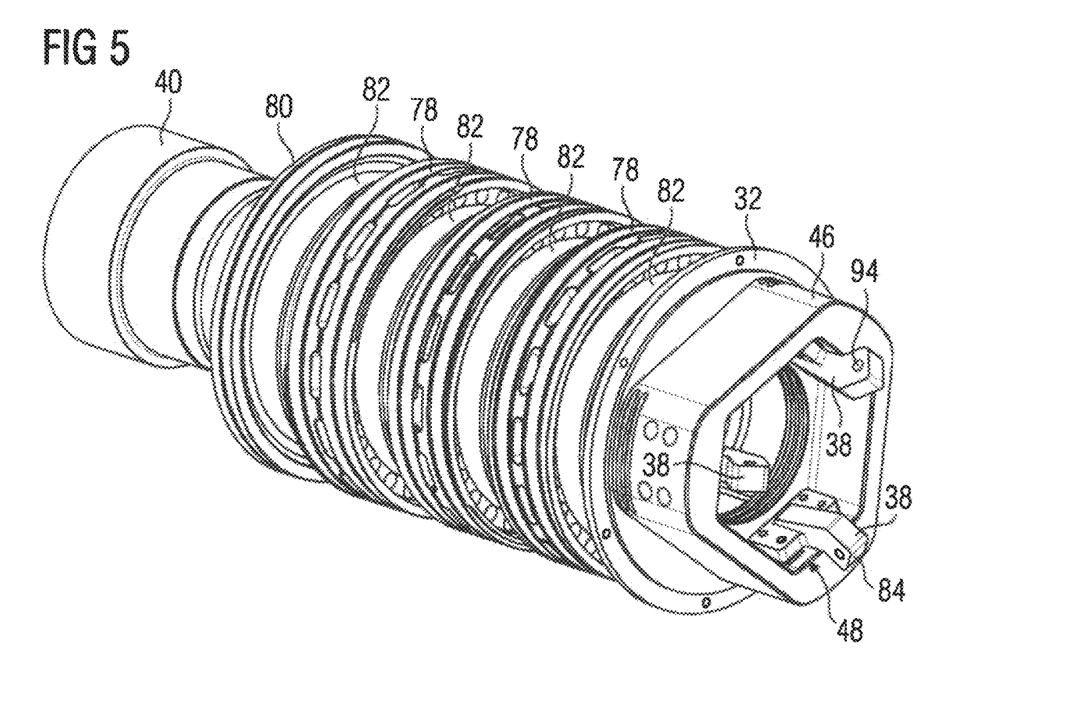
Figure 7:
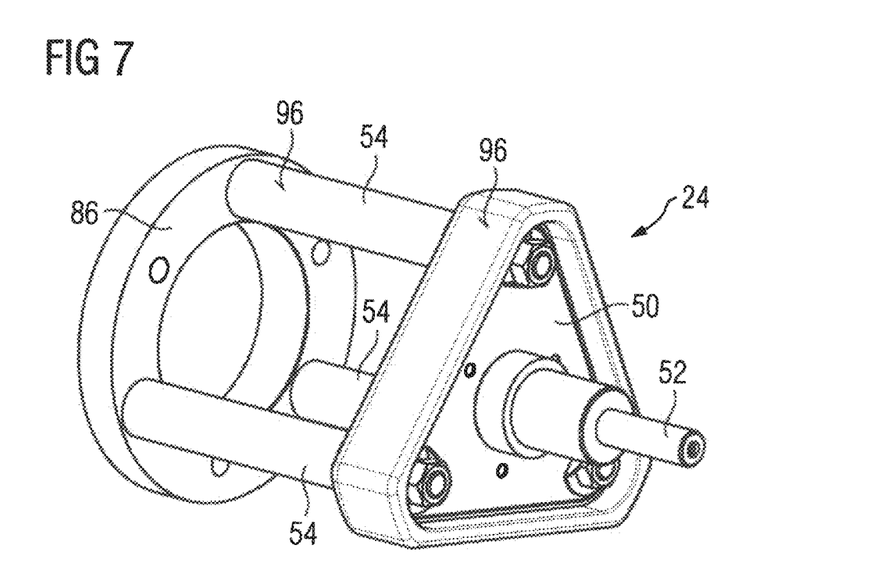
Figure 8:
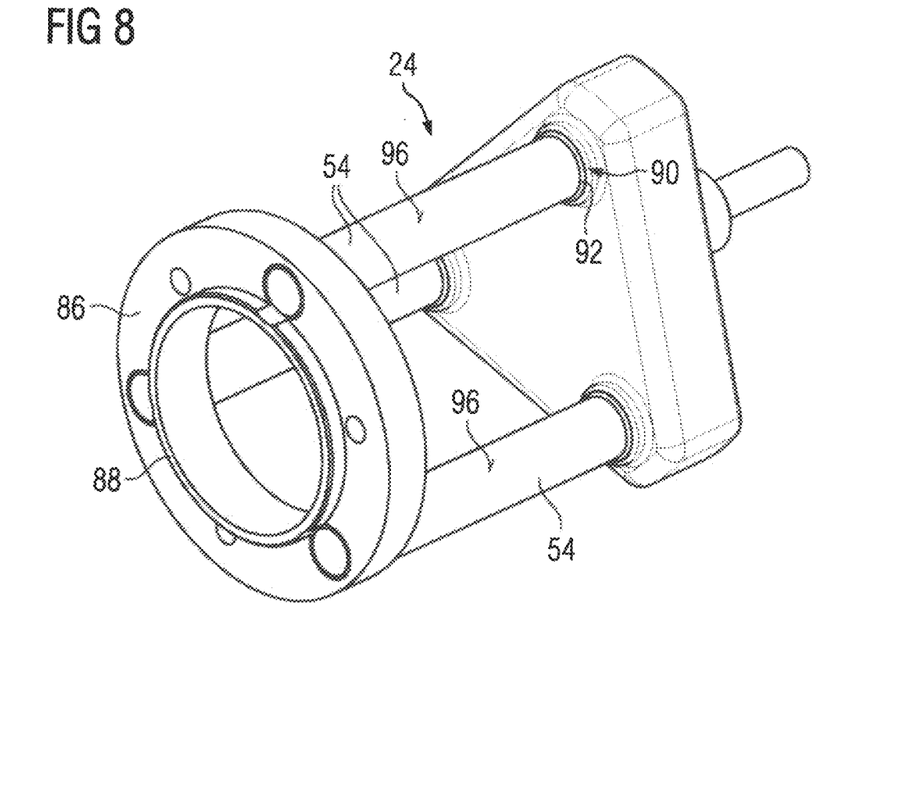

It can be seen from FIG. 4 that the driver unit 24 is arranged as shown in FIG. 2. In the arrangement provided there, it is provided that the driver unit 24 is electrically insulated from the connection adapters 38 at least in the partial region 44, which is arranged at approximately the same height as the connection adapters 38 in the direction 60 of the axis of rotation 30 of the rotor shaft 40. For this purpose, the driver unit 24 is formed according to FIGS. 7 and 8. FIGS. 7 and 8 show schematic perspective views of the driver unit 24 as used in FIG. 4. FIG. 5 shows a schematic view as in FIG. 4, in which the driver unit 24 and the line ends 42 are not shown.

It can be seen from FIG. 7 that the driver unit 24 in part comprises an electrically insulating material. The driver unit 24 comprises a retaining plate 50 having a driver pin 52 for connection to the rotary encoder 36 and three fastening bolts 54 for fastening to the face 32 of the slip ring body 22. In this embodiment, the retaining plate 50 and the fastening bolts 54 are formed from a steel.

It is provided in the present case that the fastening bolts 54 are fastened at one end to a fastening ring 86 by means of a rivet connection or a press fit, which fastening ring 86 can be fastened to the end face 32 of the slip ring body 22. For this purpose, a centering projection 88 projecting in the axial direction 60 is provided radially inwardly on the fastening ring 86 and is formed opposite the fastening bolt 54 on the fastening ring 86. In this way, the fastening ring 86 and thus also the driver unit 24 can be arranged centered with respect to the rotor shaft 40, so that a high degree of accuracy can be achieved during normal operation with respect to the centering of the driver pin 52 in relation to the rotor shaft 40 and in particular its axis of rotation 30.

FIGS. 7 and 8 further show that the retaining plate 50 is fastened to the fastening bolts 54 by means of a screw fastening. The retaining plate 50 is formed in the present case with a substantially triangular contour, wherein in regions of the various corner points there are provided openings (not denoted by a reference sign), through which axially projecting threaded pins of the fastening bolts 54 extend and are each provided with a nut in order to reliably connect the fastening bolts 54 to the retaining plate 50. FIGS. 7 and 8 further show that the retaining plate 50 and also the fastening bolts 54 have a coating 96 made of an electrically insulating material, which in the present case is a plastic. In this embodiment, the plastic is applied as a coating to the surfaces of the fastening bolts 54 and the outer surfaces of the retaining plate 50 by means of a known connection method. In an alternative embodiment, a molded part made of plastic can also be provided for each of the fastening bolts 54 as well as the retaining plate 50, which molded part is fitted onto the particular fastening bolt 54 or the retaining plate 50 and bonded thereto by means of a resin. In addition, the plastic can also be applied to the fastening bolt 54 and the retaining plate 50 by means of an injection molding process.

In FIG. 8, a lower side of the retaining plate 50 facing the slip ring body 22 can be seen. A joint 90, at which one of the fixing bolts 54 is connected to the retaining plate 50, can be seen. Furthermore, a resin 92 is applied circumferentially to the joint 90 as an insulating material in order to ensure electrical insulation at the transition from the fastening bolt 54 to the retaining plate 50. This is implemented in the same way for all the fastening bolts 54.

By suitable selection of the plastic forming the coating 96 and of the coating thickness, it is possible to ensure that the creepage distances and air gaps are maintained, as will be explained below with reference to FIGS. 9 and 10.

FIG. 6 shows the axial end 26 of the rotor shaft 40 without the slip ring body 22, but with the line ends 42 of the rotor winding. It can be seen that the line ends 42 are connected together in pairs. For this purpose, each of the line ends 42 has its own lug 64, with two of the lugs 64 in each case being connected to one another by means of a fastening screw 62. In the present case, six line ends 42 are provided, which are electrically connected to one another in pairs. This means that the rotor winding is a three-phase rotor winding connected in a delta circuit.

FIG. 5 shows that the connection adapters 38 have various through-holes 94, which are used to receive the fastening screws 62. FIG. 4 shows the connection adapters 38 and the lugs 64 in the assembled state.

FIG. 9 now shows a schematic plan view of a detail of the axial end 26 as shown in FIG. 4. It can be seen that the driver unit 24 can be arranged very close to the lugs 64 and the connection adapters 38. In FIG. 9, a distance of an air gap 66 is schematically shown, which would result in insufficient electrical insulation without the insulating coating 96 of the retaining plate 50 and the fastening bolts 54. However, the coating 96 allows the additional electrical insulation provided by the coating 96 to reliably ensure electrical insulation in conjunction with the air gap 66 shown in FIG. 9.

Figure 10:
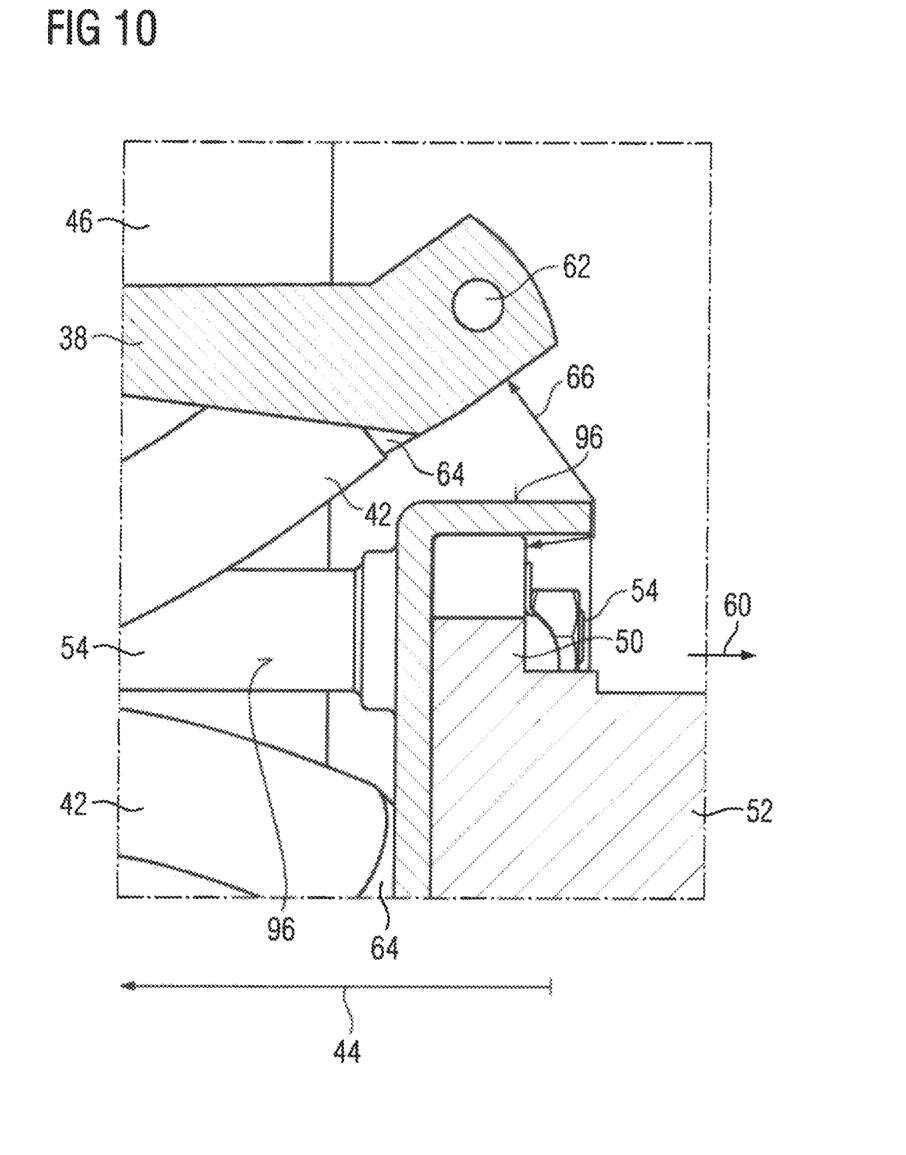

FIG. 10 shows the region from FIG. 9 in a sectional view of the driver unit 24 in the lower region of FIG. 9. It can be seen that the air gap 66 is correspondingly extended by the electrical insulation achieved by the coating 96.

FIG. 10 also shows the partial region 44, which is arranged at the same level as the connection adapters 38 in the direction 60 of the axis of rotation 30 of the rotor shaft 40. The partial region 44 extends from axial ends of the connection adapters 38 to the axial end 26 of the rotor shaft 40, which in the present case also coincides with the end face 32 of the slip ring body 22. In alternative embodiments, of course, this may also vary. This design makes it possible to reduce the axial extension of the rotor 14.

Figure 11:
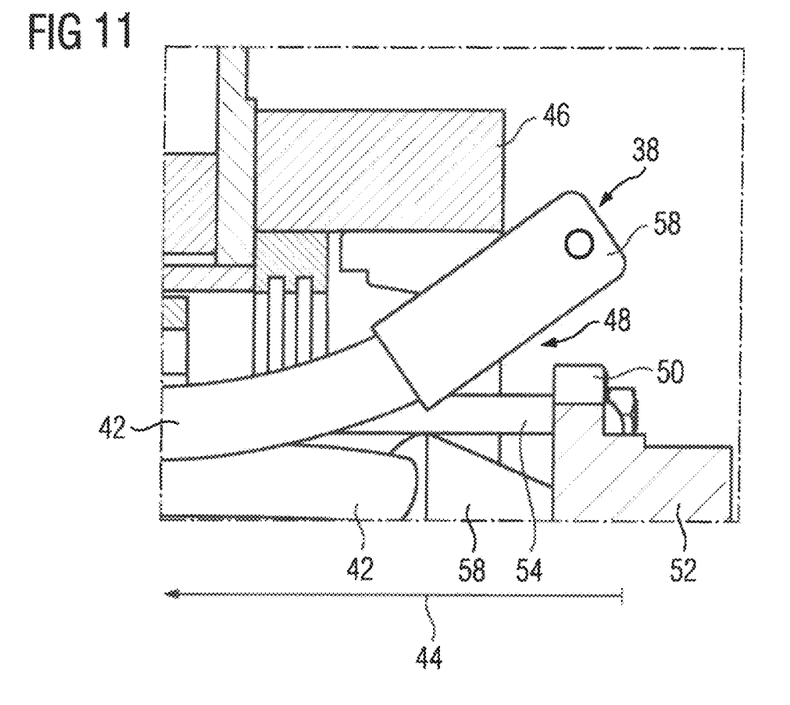
Figure 12:
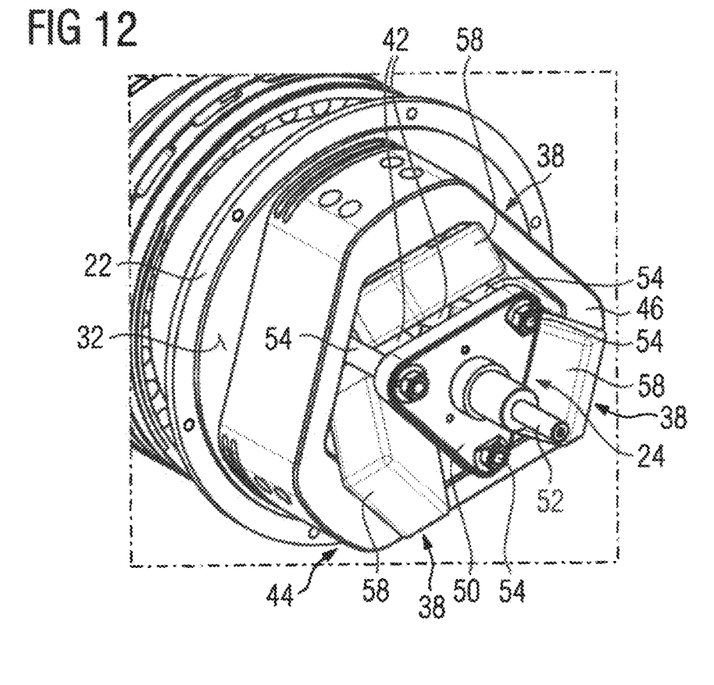

FIGS. 11 and 12 now show a further embodiment in which the electrical insulation is now not provided by the driver unit 24, but instead by the connection adapter 38. This embodiment can of course also be combined with the previously described embodiment.

FIG. 12 shows in a schematic perspective view similar to FIG. 4 the axial end of the rotor shaft 40 with the slip ring body 22, as already explained for FIG. 4, which is why reference is made in this regard to the corresponding explanations. The centrifugal force support ring 46 is fastened to the end face 32—as already explained for FIG. 4. In contrast to the embodiment according to FIG. 4, in this embodiment the driver unit 24 is formed entirely of a metal, in the present case steel. An electrical insulation, in particular a coating, is not provided for the driver unit 24 in the present case. However, the mechanical embodiment of the driver unit 24 corresponds substantially to the embodiment as already explained with reference to FIGS. 7 and 8, and therefore reference is made in this respect to the corresponding explanations. Only the coating is not provided for the driver unit 24 according to FIGS. 11 and 12.

In the embodiment according to FIGS. 11 and 12, the electrical insulation is provided by various sleeves 58, which are fitted onto the connection adapters 38 with the lugs 64 connected to them. The sleeves 58 are made of a suitable plastics material and are latched to their respective connection adapters 38 by means of a latching connection, so that they are fixed during normal operation of the asynchronous machine 10. The sleeves 58 hereby provide a suitable electrical insulation so that the creepage distances and air gaps can be maintained during normal operation of the asynchronous machine 10, more specifically in particular also with respect to the driver unit 24. The further details correspond substantially to what has already been explained in relation to the preceding figures. FIG. 11 schematically shows a sectional view through the upper region shown in FIG. 12, wherein the section is taken in the axial and radial directions.

Overall, the invention makes it possible to increase the integration density at the axial end 26 of the rotor shaft 40 so that the dimensions of the asynchronous machine 10, in particular its rotor 14, can be reduced. By applying electrically insulating material, creepage distances and air gaps between conductive materials can be increased, whereby installation space can be saved accordingly because distances to electrically conductive parts can be reduced. In particular, air gaps can be selectively extended and/or designed as desired. It is also possible to lay current-carrying parts, separated by insulating material, in direct contact, whereby a further reduction in installation space can be achieved.

The invention thus allows voltage-carrying parts to be positioned closer to one another, i.e., the electrical insulation is preferably formed in such a way that the air gaps can be extended by a design of the insulation. In particular, distances that conform to standards can thus be achieved, wherein at the same time the installation space can be reduced or optimized, because the air gaps can be extended by design.

By applying an insulating material or an insulating substance to the driver unit, it is possible in particular to reduce the distances between current-carrying parts in order to save space and installation space. The insulating material is preferably applied to critical points of the driver unit, for example as a coating, and can thus result in air gaps being extended. As a result, individual components, including voltage-carrying components, can have contact with the insulation material of the driver unit without dangerous conditions occurring.

The embodiment examples serve exclusively to explain the invention and are not intended to limit it. They can also be combined with each other. In particular, the invention is of course not limited to internal rotors and can be used equally for external rotors.

The invention claimed is:

1. A rotor for a rotating electric machine, said rotor comprising:
   a rotor shaft;
   a rotor winding arranged for conjoint rotation on the rotor shaft;
   a slip ring body arranged on an axial end of the rotor shaft and having an end face which is formed on an axial end of the slip ring body in opposition to the rotor winding, said slip ring body including connection adapters which project axially beyond the end face of the slip ring body for connection of line ends of the rotor winding;
   a driver unit for a rotary encoder which is arranged non-rotatably in relation to the rotor, said driver unit being fastened to the end face of the slip ring body and/or to the axial end of the rotor shaft and electrically insulated from the connection adapters at least in a partial region which is arranged at a same level as the connection adapters in a direction of an axis of rotation of the rotor shaft; and a centrifugal force support ring having a through-opening and arranged on the end face of the slip ring body in such a way that the connection adapters and the driver unit are arranged at least in part in the through-opening of the centrifugal force support ring.

2. The rotor of claim 1, wherein the driver unit at least in part comprises an electrically insulating material.

3. The rotor of claim 2, wherein the electrically insulating material at least in part forms a coating of the driver unit.

4. The rotor of claim 1, wherein the driver unit includes a retaining plate with a driver pin for connection to the rotary encoder, and at least one fastening bolt for fastening the driver unit to the end face of the slip ring body and/or to the axial end of the rotor shaft, wherein the retaining plate and the at least one fastening bolt are electrically insulated.

5. The rotor of claim 4, wherein the retaining plate and/or the at least one fastening bolt are formed from an electrically insulating material.

6. The rotor of claim 4, wherein the retaining plate and/or the at least one fastening bolt are coated with an electrically insulating material.

7. The rotor of claim 1, wherein the connection adapters include an electrical insulation.

8. The rotor of claim 7, wherein the electrical insulation is formed at least in part by a sleeve made of an electrically insulating material.

9. A rotating electric machine, comprising:

a stator; and a rotor arranged rotatably mounted in an opening of the stator, said rotor comprising a rotor shaft, a rotor winding arranged for conjoint rotation on the rotor shaft, a slip ring body arranged on an axial end of the rotor shaft and having an end face which is formed on an axial end of the slip ring body in opposition to the rotor winding, said slip ring body including connection adapters which project axially beyond the end face of the slip ring body for connection of line ends of the rotor winding, a driver unit for a rotary encoder which is arranged non-rotatably in relation to the rotor, said driver unit being fastened to the end face of the slip ring body and/or to the axial end of the rotor shaft and electrically insulated from the connection adapters at least in a partial region which is arranged at a same level as the connection adapters in a direction of an axis of rotation of the rotor shaft, and a centrifugal force support ring having a through-opening and arranged on the end face of the slip ring body in such a way that the connection adapters and the driver unit are arranged at least in part in the through-opening of the centrifugal force support ring.

10. The rotating electric machine of claim 9, wherein the driver unit at least in part comprises an electrically insulating material.

11. The rotating electric machine of claim 10, wherein the electrically insulating material at least in part forms a coating of the driver unit.

12. The rotating electric machine of claim 9, wherein the driver unit includes a retaining plate with a driver pin for connection to the rotary encoder, and at least one fastening bolt for fastening of the driver unit to the end face of the slip ring body and/or to the axial end of the rotor shaft, wherein the retaining plate and the at least one fastening bolt are electrically insulated.

13. The rotating electric machine of claim 12, wherein the retaining plate and/or the at least one fastening bolt are formed from an electrically insulating material.

14. The rotating electric machine of claim 12, wherein the retaining plate and/or the at least one fastening bolt are coated with an electrically insulating material.

15. The rotating electric machine of claim 9, wherein the connection adapters include an electrical insulation.

16. The rotating electric machine of claim 15, wherein the electrical insulation is formed at least in part by a sleeve made of an electrically insulating material.

* * * * *